United States Patent
Jin et al.

(10) Patent No.: US 10,979,113 B2
(45) Date of Patent: Apr. 13, 2021

(54) INFORMATION FEEDBACK METHOD, USER EQUIPMENT, AND NETWORK DEVICE

(71) Applicant: HUAWEI TECHNOLOGIES CO., LTD., Guangdong (CN)

(72) Inventors: Huangping Jin, Shanghai (CN); Wei Han, Shanghai (CN); Peng Shang, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/005,921

(22) Filed: Aug. 28, 2020

(65) Prior Publication Data

US 2020/0395984 A1     Dec. 17, 2020

Related U.S. Application Data

(63) Continuation of application No. 16/520,045, filed on Jul. 23, 2019, now Pat. No. 10,778,299, which is a
(Continued)

(30) Foreign Application Priority Data

Nov. 4, 2016    (CN) .......................... 201610963566.3
Apr. 4, 2017    (CN) .......................... 201710215597.5

(51) Int. Cl.
    *H04B 7/0456*       (2017.01)
    *H04B 7/0417*       (2017.01)
(Continued)

(52) U.S. Cl.
    CPC ............. *H04B 7/0478* (2013.01); *H04B 7/04* (2013.01); *H04B 7/0417* (2013.01); *H04B 7/063* (2013.01);
(Continued)

(58) Field of Classification Search
CPC .. H04B 7/0478; H04B 7/0456; H04B 7/0417; H04B 7/04; H04B 7/0626; H04B 7/063; H04B 7/0639; H04B 7/0658; H04L 1/0026
See application file for complete search history.

(56) References Cited

U.S. PATENT DOCUMENTS 10,374,673 B2 *   8/2019   Jin .......................... H04B 7/063
2013/0107920 A1 *   5/2013   Kim ..................... H04B 7/0456
                                                                                 375/219
(Continued)

FOREIGN PATENT DOCUMENTS

CN     103746730 A     4/2014
CN     104184560 A    12/2014
(Continued)

OTHER PUBLICATIONS

Fang Yuan et al: "Weighted OFT Codebook for Multiuser MIMO in Spatially Correlated Channels", Vehicular Technology Conference (VTC Spring), 2011 IEEE 73rd, IEEE, May 15, 2011, pp. 1-5, XP031897012.
(Continued)

*Primary Examiner* — Sung S Ahn
(74) *Attorney, Agent, or Firm* — Fish & Richardson P.C.

(57) ABSTRACT

The present disclosure relates to channel state information (CSI) receiving methods and apparatus. One example method includes transmitting a pilot, and receiving feedback of $W_1$ and $W_2$ for each transport layer which are determined based on the pilot, where $W_1$ and $W_2$ are used to form a combined vector W for each transport layer, $W=W_1 \times W_2$, $W_1 = [b_1 \ b_2 \ \ldots \ b_K]$, $b_i$ is a vector to be combined, $W_2 = [X_1 \ X_2 \ \ldots \ X_K]^T$, $X_i$ is a weighting coefficient corresponding to $b_i$, K is a quantity of vectors in $W_1$, K is a positive integer which is greater than 1, i is an integer, $1 \le i \le K$, and quantities
(Continued)

of bits for feeding back at least two elements in $W_2$ are different from each other.

24 Claims, 5 Drawing Sheets

Related U.S. Application Data continuation of application No. 16/228,357, filed on Dec. 20, 2018, now Pat. No. 10,374,673, which is a continuation of application No. PCT/CN2017/107138, filed on Oct. 20, 2017.

(51) Int. Cl.
*H04B 7/04* (2017.01)
*H04B 7/06* (2006.01)

(52) U.S. Cl.
CPC ......... *H04B 7/0626* (2013.01); *H04B 7/0639* (2013.01); *H04B 7/0658* (2013.01)

(56) References Cited

U.S. PATENT DOCUMENTS

| | | | | |
|---|---|---|---|---|
| 2013/0129014 | A1* | 5/2013 | Kim | H04B 7/0469 375/295 |
| 2013/0223549 | A1* | 8/2013 | Tong | H04B 7/0456 375/260 |
| 2014/0362784 | A1 | 12/2014 | Yue et al. | |
| 2014/0376652 | A1* | 12/2014 | Sayana | H04B 7/0456 375/267 |
| 2015/0372731 | A1 | 12/2015 | Song et al. | |
| 2016/0065289 | A1 | 3/2016 | Zhao et al. | |
| 2016/0072562 | A1 | 3/2016 | Onggosanusi et al. | |
| 2016/0142117 | A1 | 5/2016 | Rahman et al. | |
| 2016/0352401 | A1 | 12/2016 | Yu et al. | |
| 2017/0099093 | A1 | 4/2017 | Zhang et al. | |
| 2017/0163321 | A1 | 6/2017 | Wang et al. | |
| 2018/0034519 | A1* | 2/2018 | Rahman | H04B 7/0452 |
| 2019/0123796 | A1 | 4/2019 | Jin et al. | |

FOREIGN PATENT DOCUMENTS

| | | | |
|---|---|---|---|
| CN | 105340209 | A | 2/2016 |
| CN | 105406911 | A | 3/2016 |
| CN | 105706373 | A | 6/2016 |
| CN | 105939169 | A | 9/2016 |
| CN | 104541456 | B | 11/2017 |
| CN | 108023617 | A | 5/2018 |
| JP | 2013539312 | A | 10/2013 |
| JP | 2014175810 | A | 9/2014 |
| KR | 20130009921 | A | 1/2013 |
| KR | 20150028019 | A | 3/2015 |
| WO | 2014169421 | A1 | 10/2014 |
| WO | 2015152624 | A1 | 10/2015 |
| WO | 2016164058 | A1 | 10/2016 |

OTHER PUBLICATIONS

Huawei, HiSilicon,"Design for Type I Feedback",3GPP TSG RAN WG1 Meeting #87, R1-1611675, Reno, USA, Nov. 14-18, 2016,total 7 pages, XP051190079.
Huawei, HiSilicon,"Design for Type I Feedback",3GPP TSG RAN WG1 NR Ad Hoc Meeting, R1-17004 14, Spokane, USA, Jan. 16-20, 2017,total 8 pages, XP051207951.
R1-1612351,Ericsson:"Type II CSI Feedback", 3GPP TSG-RAN WG1#87, Reno, USA Nov. 14-18, 2016, 10 pages.
R1-166139 Huawei, HiSilicon,"Advanced CSI feedback framework for LTE",3GPP TSG RAN WG1 Meeting #86, Gothenburg, Sweden, Aug. 22-26, 2016,total 7 pages.
Huawei, HiSilicon, "CSI acquisition mechanism for NR DL MIMO," 3GPP TSG RAN WG1 Meeting #86, R1-167197, Gothenburg, Sweden, Aug. 22-26, 2016, 9 pages.
Office Action issued in Japanese Application No. 2019-523828 dated Sep. 1, 2020, 7 pages (with English translation).
Office Action issued in Korean Application No. 10-2019-7016135 dated Sep. 25, 2020, 5 pages (With English Translation).
Office Action issued in Indian Application No. 201937019053 dated Nov. 10, 2020, 6 pages.

* cited by examiner

INFORMATION FEEDBACK METHOD, USER EQUIPMENT, AND NETWORK DEVICE

CROSS-REFERENCE TO RELATED APPLICATIONS

This application is a continuation of U.S. patent application Ser. No. 16/520,045, filed on Jul. 23, 2019, which is a continuation of U.S. patent application Ser. No. 16/228,357, filed on Dec. 20, 2018, which is a continuation of International Application No. PCT/CN2017/107138, filed on Oct. 20, 2017. The International Application claims priority to Chinese Patent Application No. 201610963566.3, filed on Nov. 4, 2016, and Chinese Patent Application No. 201710215597.5, filed on Apr. 4, 2017. All of the aforementioned patent applications are hereby incorporated by reference in their entireties.

TECHNICAL FIELD

The present invention relates to wireless communications technologies, and in particular, to an information feedback method, user equipment, and a network device.

BACKGROUND

A massive multiple input multiple output (MIMO) technology is one of key technologies of a 5th generation (5G) communications system, as universally acknowledged. In the massive MIMO, large-scale antennas are used, so that spectrum efficiency is remarkably improved. Accuracy of channel state information (CSI) obtained by a network device determines performance of the massive MIMO to a great extent. In a frequency division duplex (FDD) system or a time division duplex (TDD) system in which channel reciprocity cannot be better satisfied, a codebook is usually used to quantize CSI information. Therefore, codebook design is a key issue of the massive MIMO.

In the prior art, one optimal codeword is selected from a plurality of candidate codewords, and the selected codeword is reported as CSI information in a form of a precoding matrix indication (PMI). Massive MIMO using a new radio (NR) technology imposes a higher requirement on channel state information feedback. The foregoing mechanism cannot satisfy a high-precision CSI requirement of the NR. In view of this, currently, in the NR, a discussion of high-precision CSI feedback mechanism design mainly focuses on a method for representing CSI by linearly superposing a plurality of codewords, so that a quantization precision loss caused when CSI is represented by using a single codeword is compensated for, and CS feedback quality is remarkably improved.

For the method for representing CSI by linearly superposing a plurality of codewords, an information feedback method needs to be provided to improve channel state information feedback precision.

SUMMARY

In view of this, it is necessary to provide an information feedback method to improve channel state information feedback precision.

A first aspect of the present invention provides an information feedback method, including: determining a codebook of CSI at each transport layer of user equipment UE, where the codebook of the CSI at each transport layer of the UE is:

$W = W_1 \times W_2$, where

W is the codebook of the CSI at each transport layer of the UE, $W_1$ is a level-1 codebook, $W_1 = [b_1 \ b_2 \ \ldots \ b_K]$, $b_i$ represents a codeword, K is a quantity of columns of $W_1$, K is a positive integer greater than or equal to 1, $W_2$ is a level-2 codebook, $W_2$ is represented as $W_2 = [X_1 \ X_2 \ \ldots \ X_K]^T$, an element $X_i$ in $W_2$ is a weighting coefficient corresponding to each codeword in $W_1$, and i is an integer greater than or equal to 1 and less than or equal to K;

determining a quantity $N_i$ of bits occupied by a quantized value of an $i^{th}$ element in $W_2$, where quantized values of at least two elements in $W_2$ occupy different quantities of bits; and feeding back the quantized value of the $i^{th}$ element to a network device based on $N_i$.

A second aspect of the present invention provides an information feedback method, including:

receiving, by a network device, a bit sequence sent by user equipment UE, where the bit sequence includes a quantized value of a codebook of CSI of the UE at each transport layer, and the codebook of the CSI at each transport layer of the UE is:

$W = W_1 \times W_2$, where

W is the codebook of the CSI at each transport layer of the UE, $W_1$ is a level-1 codebook, $W_1 = [b_1 \ b_2 \ \ldots \ b_K]$, $b_i$ represents a codeword, K is a quantity of columns of $W_1$, K is a positive integer greater than or equal to 1, $W_2$ is a level-2 codebook, $W_2$ is represented as $W_2 = [X_1 \ X_2 \ \ldots \ X_K]^T$, an element $X_i$ in $W_2$ is a weighting coefficient corresponding to each codeword in $W_1$, i is an integer greater than or equal to 1 and less than or equal to K, the quantized value of the codebook of the CSI at each transport layer of the UE includes a quantized value of the element $X_i$ in $W_2$, and quantized values of at least two elements in $W_2$ in the bit sequence occupy different quantities of bits;

determining, by the network device, a quantity $N_i$ of bits occupied by a quantized value of an $i^{th}$ element in $W_2$; and extracting, by the network device, the quantized value of the $i^{th}$ element from the received bit sequence based on $N_i$.

A third aspect of the present invention provides user equipment, including: a processing unit, configured to determine a codebook of CSI of the UE at each transport layer, where the codebook of the CSI at each transport layer of the UE is:

$W = W_1 \times W_2$, where

W is the codebook of the CSI at each transport layer of the UE, $W_2$ is a level-1 codebook, $W_1 = [b_1 \ b_2 \ \ldots \ b_K]$, $b_i$ represents a codeword, K is a quantity of columns of $W_1$, K is a positive integer greater than or equal to 1, $W_2$ is a level-2 codebook, $W_2$ is represented as $W = [X_1 \ X_2 \ \ldots \ X_K]^T$, an element $X_i$ in $W_2$ is a weighting coefficient corresponding to each codeword in $W_1$ and i is an integer greater than or equal to 1 and less than or equal to K, where the processing unit is further configured to determine a quantity $N_i$ of bits occupied by a quantized value of an $i^{th}$ element in $W_2$, where quantized values of at least two elements in $W_2$ occupy different quantities of bits; and a sending unit, configured to feed back the quantized value of the $i^{th}$ element to a network device based on $N_i$.

A fourth aspect of the present invention provides a network device, including:

a receiving unit, configured to receive a bit sequence sent by user equipment UE, where the bit sequence includes a quantized value of a codebook of CSI of the UE at each transport layer, and the codebook of the CSI at each transport layer of the UE is:

$$W = W_1 \times W_2, \text{ where}$$

W is the codebook of the CSI at each transport layer of the UE, $W_1$ is a level-1 codebook, $W_1=[b_1 \; b_2 \; \ldots \; b_K]$, $b_i$ represents a codeword, K is a quantity of columns of $W_1$, K is a positive integer greater than or equal to 1, $W_2$ is a level-2 codebook, $W_2$ is represented as $W_2=[X_1 \; X_2 \; \ldots \; X_K]^T$, an element $X_i$ in $W_2$ is a weighting coefficient corresponding to each codeword in $W_1$, i is an integer greater than or equal to 1 and less than or equal to K, the quantized value of the codebook of the CSI at each transport layer of the UE includes a quantized value of the element $X_i$ in $W_2$, and quantized values of at least two elements in $W_2$ in the bit sequence occupy different quantities of bits; and a processing unit, configured to determine a quantity $N_i$ of bits occupied by a quantized value of an $i^{th}$ element in $W_2$; and configured to extract the quantized value of the $i^{th}$ element from the received bit sequence based on $N_i$.

In the embodiments of the present invention, the quantity $N_i$ of bits occupied by the quantized value of the $i^{th}$ element in $W_2$ is determined, and the quantized values of at least two elements in $W_2$ occupy different quantities of bits so that quantization precision can be improved, and further, CSI feedback precision can be improved.

DESCRIPTION OF EMBODIMENTS

With continuous development of communications theories and practice, more wireless communications technologies emerge and become mature. The wireless communications technologies include but are not limited to: a Time Division Multiple Access (TDMA) technology, a Frequency Division Multiple Access (FDMA) technology, a Code Division Multiple Access (CDMA) technology, Time Division-Synchronous Code Division Multiple Access (TD-SCDMA) technology, an Orthogonal Frequency Division Multiple Access (OFDMA) technology, a Single Carrier Frequency Division Multiple Access (SC-FDMA) technology, a Space Division Multiple Access (SDMA) technology, and evolved and derivative technologies of these technologies. The wireless communications technologies are adopted in a plurality of wireless communications standards as radio access technologies (RAT) to construct various wireless communications systems (or networks) commonly known by people at the present, including but not limited to: Global System for Mobile Communications (GSM), CDMA2000, wideband CDMA (WCDMA), WiFi defined in 802.11 series of standards, Worldwide Interoperability for Microwave Access (WiMAX), Long Term Evolution (LTE). LTE-Advanced (LTE-A), and evolved systems of these wireless communications systems. Unless otherwise noted, the technical solutions provided in the embodiments of the present invention may be applied to the foregoing various wireless communications technologies and wireless communications systems. In addition, the terms "system" and "network" can be interchanged with each other.

Figure 1:
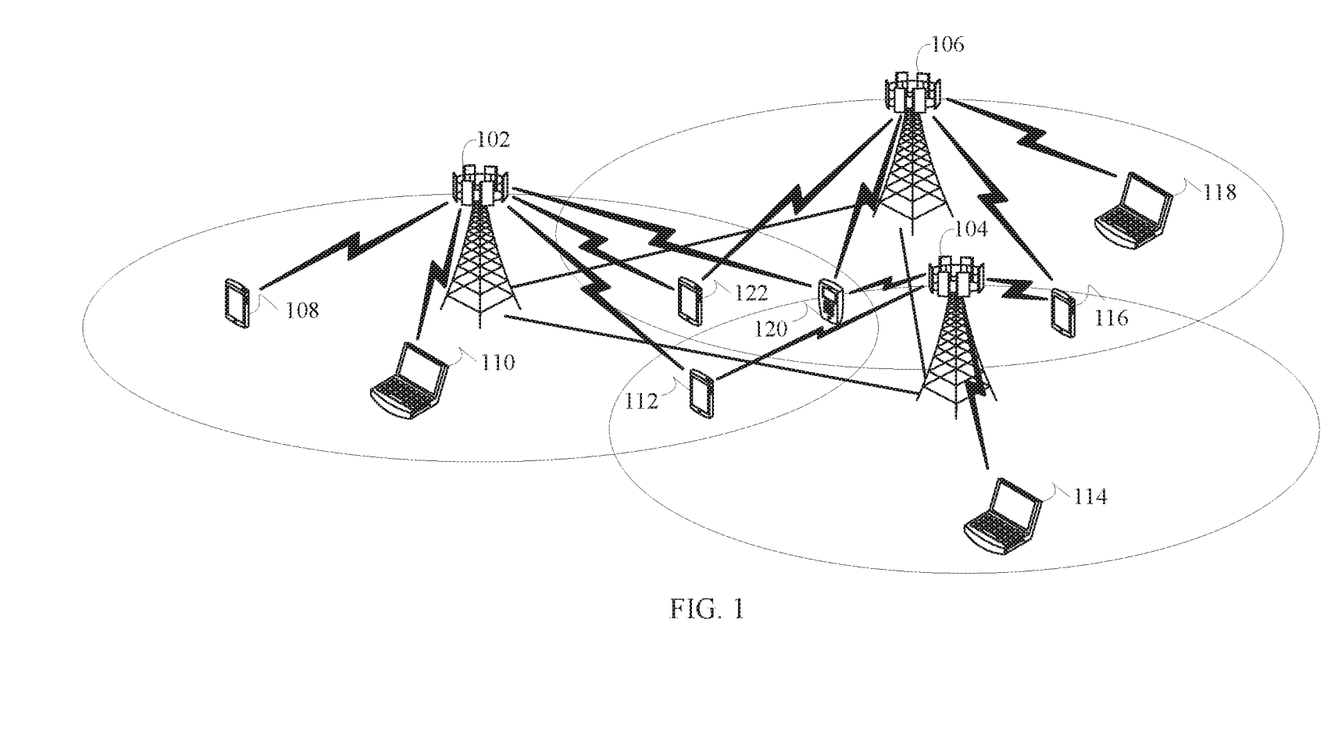
FIG. 1 is a schematic diagram of an example of a wireless communications network according to an embodiment of the present invention.

FIG. 1 is a schematic diagram of an example of a wireless communications network according to an embodiment of the present invention. As shown in FIG. 1, the wireless communications network includes network devices 102 to 106 and user equipment (UE) 108 to 122. The network devices 102 to 106 may communicate with each other by using a backhaul link (for example, indicated by straight lines between the network devices 102 to 106). The backhaul link may be a wired backhaul link (for example, an optical fiber, or a copper cable), or may be a wireless backhaul link (for example, a microwave). The user equipment 108 to 122 may communicate with the network devices 102 to 106 by using wireless links (for example, indicated by broken lines between the network devices 102 to 106 and the user equipment 108 to 122).

The network devices 102 to 106 are configured to provide radio access services for the user equipment 108 to 122. Specifically, each network device provides a service coverage area (which may be alternatively referred to as a cell, as indicated by each elliptic area in FIG. 1), and user equipment entering the area may communicate with the network device by using a radio signal to accept the radio access service provided by the network device. Service coverage areas of the network devices may overlap, and user equipment in an overlapping area may receive radio signals from a plurality of network devices. For example, as shown in FIG. 1, the service coverage area of the network device 102 overlaps the service coverage area of the network device 104, and the user equipment 112 is located in the overlapping area. Therefore, the user equipment 112 may receive radio signals from the network device 102 and the network device 104. For another example, as shown in FIG. 1, there is a common overlapping area between the service coverage areas of the network devices 102, 104, and 106, and the user equipment 120 is located in the overlapping area. Therefore, the user equipment 120 may receive radio signals from the network devices 102, 104, and 106.

Depending on a used wireless communications technology, a network device may be alternatively referred to as a NodeB, an evolved NodeB (eNodeB), an access point (AP), or the like. In addition, based on sizes of provided service coverage areas, network devices may be further classified into a macro base station configured to provide a macro cell, a micro base station configured to provide a pico cell, and a femto base station configured to provide a femto cell. With the constant evolution of wireless communications technologies, a network device in the future may alternatively have another name.

The user equipment 108 to 122 may be wireless communications devices having a wireless communication function. For example, the wireless communications devices include but are not limited to a mobile cellular phone, a cordless phone, a personal digital assistant (PDA), a smartphone, a notebook computer, a tablet computer, a wireless data card, a wireless modem, or a wearable device such as a smart watch. With rise of an Internet of Things (IOT) technology, wireless communications units start to be configured in more devices that do not have a communication function previously, so that the devices have a wireless communication function, and can access a wireless communications network and receive remote control. For example, the devices include but are not limited to household appliances, vehicles, tool equipment, service equipment, and service facilities. Such devices have the wireless communication function because wireless communications units are configured in the devices. Therefore, the devices belong to a scope of wireless communications devices. In addition, the user equipment 108 to 122 may be alternatively referred to as mobile stations, mobile devices, mobile terminals, wireless terminals, handheld devices, clients, and the like.

A plurality of antennas may be configured in the network devices 102 to 106 and the user equipment 108 to 122 to support a MIMO technology. Furthermore, the user equipment 108 to 122 not only can support single-user MIMO (SU-MIMO), but also can support multi-user MIMO (MU-MIMO) by virtue of an SDMA technology. Because the plurality of antennas are configured, the network devices 102 to 106 and the user equipment 108 to 122 may further flexibly support a single input single output (SISO) technology, a single input multiple output (SIMO) technology, and a multiple input single output (MISO) technology. SIMO may be alternatively referred to as a receive diversity (RD), and MISO may be alternatively referred to as a transmit diversity (TD).

In addition, the network device 102 may communicate with the user equipment 108 to 110 by using various wireless communications technologies. For example, the wireless communications technologies include but are not limited to the foregoing various wireless communications technologies.

It should be noted that the wireless communications network in FIG. 1 is merely used as an example, but is not used to limit the technical solutions of the present invention. A person skilled in the art should understand that during a specific implementation process, the wireless communications network further includes another device. The another device, for example, includes but is not limited to a network device controller. In addition, the network devices and the user equipment may be alternatively configured based on specific needs.

According to the technical solutions provided in the embodiments of the present invention, user equipment feeds back channel state information (CSI) to a network device, and the network device adjusts, based on the CSI, a radio signal needing to be sent to the user equipment, so as to achieve a better receiving effect on the user equipment side. The following specifically describes a CSI feedback process provided in the embodiments of the present invention.

During a CSI information feedback process, the network device sends a downlink signal, and the downlink signal carries a pilot. The user equipment determines channel information based on the pilot included in the received downlink signal. For example, the channel information may be represented as a channel matrix. The user equipment determines, based on the determined channel information and a preset coding codebook, a codebook used to represent CSI of the UE, generates the CSI based on the codebook of the CSI of the UE, and feeds back the CSI to the network device. The network device obtains the codebook of the CSI of the UE based on the received CSI. The network device may precode, by using the codebook, a signal needing to be sent to the user equipment.

If there are L transport layers, and L is greater than or equal to 1, the user equipment determines a codebook of CSI at each transport layer, and generates, based on the codebook of the CSI at each transport layer of the UE, the CSI at the transport layer.

A preset coding codebook may be represented as $B=[b_1 \ b_2 \ \ldots \ b_M]$, and $b_i$ is an $i^{th}$ codeword in the preset coding codebook B.

The codebook of the CSI at each transport layer of the UE may be represented as:

$$W = W_1 \times W_2.$$

W is the codebook of the CSI at each transport layer of the UE. $W_1$ is a level-1 codebook, and may be represented as $W_1=[b_1 \ b_2 \ \ldots \ b_K]$. $b_i$ in $W_1$ represents a codeword. K is a quantity of columns of $W_1$, and K is a positive integer greater than or equal to 1. $b_i$ in $W_1$ may be a column vector, and $b_i$ in $W_1$ is a codeword selected from the codebook B. The UE may select an appropriate codeword from the preset coding codebook based on the determined channel information and based on a preset selection criterion (for example, the preset selection criterion includes but is not limited to a maximum channel capacity criterion, a minimum mean square error criterion, or a minimum singular value criterion). $b_i$ that is selected from the codebook B may be selected by the UE from the codebook B based on the channel information. For example, the selected codeword is K largest basis obtained by projecting a channel eigenvector of the UE or a precoding vector calculated by using the channel information of the UE on the codebook B. The UE may select the codebook $W_1$ based on wideband or narrowband channel information, and in an actual system, one or more subbands are allocated to the UE. The wideband channel information is used to indicate an entire channel characteristic of all subbands occupied by the UE, and is, for example, a mean of channel information of all allocated subbands. The channel information is used to represent a channel characteristic, and may be a channel H or a related matrix of H.

$W_1$ may be alternatively represented as $W_1=[p_1 b_1 \ p_2 b_2 \ \ldots \ p_K b_K]$, K is a quantity of columns of $W_1$, K is a positive integer greater than or equal to 1, $b_i$ in $W_1$ represents a codeword. $p_i$ represents amplitude weight information of a corresponding codeword, $0 \leq p_i \leq 1$, and $p_1=1$. $b_i$ in $W_1$ may be a column vector, and $b_i$ in $W_1$ is a codeword selected from the codebook B. The UE may select an appropriate codeword from a preset coding codebook based on determined wideband or narrowband channel information and based on a preset selection criterion (for example, the preset selection criterion includes but is not limited to a maximum channel capacity criterion, a minimum mean square error criterion, or a minimum singular value criterion). $b_i$ that is in $W_1$ and that is selected from the codebook B may be selected by the UE from the codebook B based on the channel information. For example, the selected codeword is K largest basis obtained by projecting a channel eigenvector of the UE or a precoding vector calculated by using the channel information of the UE on the codebook B. Amplitude weight information $p_i$ of a corresponding codeword may also be obtained based on the wideband or narrowband channel information of the UE.

A receive end device may determine the channel matrix by using a pilot transmitted by a transmit end device.

$W_2$ is a level-2 codebook, $W_2$ may be represented as $W_2=[X_1 X_2 \ldots X_K]^T$, and an element $X_i$ in $W_2$ is a weighting coefficient corresponding to each codeword $b_i$ in $W_1$. i is an integer greater than or equal to 1 and less than or equal to K. The codebook $W_2$ may be calculated by using the wideband channel information of the UE, so that each of the subbands of the UE corresponds to a same codebook coefficient. In other words, in this case, the UE needs to feed back only one $W_2$. The codebook $W_2$ may be calculated by using the narrowband channel information of the UE, so that each subband of the UE corresponds to one codebook coefficient. In other words, in this case, the UE needs to feed back $W_2$ in each subband. A weighting coefficient in $W_2$ is a basis obtained by projecting a narrowband or wideband channel eigenvector of the UE or a precoding vector calculated by using the narrowband or wideband channel information of the UE on the $W_1$. Usually, a weighting coefficient of a codeword in $W_1$ may be represented as $$W_2' = \begin{pmatrix} \alpha_{11} \\ \alpha_{21} \\ \vdots \\ \alpha_{K1} \end{pmatrix},$$

and $W_2$, represented as $W_2=[X_1 X_2 \ldots X_K]^T$, is obtained by performing column transpose on $W'_2$.

$W_2$ may also be represented as: $W_2=[1\ X_2 \ldots X_K]^T$. An element 1 in $W_2$ is a weighting coefficient corresponding to the first column vector of $W_1$, $X_i$ is a weighting coefficient corresponding to an $i^{th}$ column vector of $W_1$, and i is an integer greater than or equal to 2 and less than or equal to K. The codebook $W_2$ may be calculated by using the wideband channel information of the UE, so that each of the subbands of the UE corresponds to a same codebook coefficient. In other words, in this case, the UE needs to feed back only one $W_2$. The codebook $W_2$ may be calculated by using the narrowband channel information of the UE, so that each subband of the UE corresponds to one codebook coefficient. In other words, in this case, the UE needs to feed back $W_2$ in each subband. The weighting coefficient in $W_2$ is usually a basis obtained by projecting a narrowband or wideband channel eigenvector of the UE or a precoding vector calculated by using the narrowband or wideband channel information of the UE on the $W_1$. Usually, a weighting coefficient of a codeword in $W_1$ may be represented as $$W_2' = \begin{pmatrix} 1 \\ \alpha_{21} \\ \vdots \\ \alpha_{K1} \end{pmatrix},$$

and $W_2$, represented as $W_2=[1\ X_2 \ldots X_K]^T$, is obtained by performing column transpose on $W'_2$.

Generating the CSI based on the codebook of the CSI at each transport layer of the UE usually means that indexes corresponding to values of corresponding $W_1$ and $W_2$ in the codebook of the CSI at each transport layer of the UE are carried in a corresponding precoding matrix indicator (PMI), and the precoding matrix indicators are fed back as CSI. In addition to the PMI, the CSI may further include at least one of the following indicators: a channel quality indicator (CQI) and a rank indication (RI). An air interface resource is limited, and a quantity of bits used to transmit CSI is limited. To transmit, by using a limited quantity of bits, the codebook $W_2$ in which values are continuous, values of elements in $W_2$ need to be quantized, so that an outputted bit sequence is used to indicate indexes of the values of the elements in $W_2$. Quantization means that a continuous range is represented as discrete ranges. For example, an interval [0-10] is divided into four sub-intervals: [0-4], [5-6], [7-8], and [8-10], and the four sub-intervals are respectively represented by using indexes 0, 1, 2, and 3. For example, a value 3 belongs to the sub-interval [0-4], and may be indexed by using an index 0.

In this embodiment of the present invention, a quantity $N_i$ of bits occupied by a quantized value of an $i^{th}$ element in $W_2$ is determined, and quantized values of at least two elements in $W_2$ occupy different quantities of bits, so that quantization precision can be improved, and further, CSI feedback precision can be improved.

In this embodiment of the present invention, a quantity $M_i$ of bits occupied by a quantized value of $p_i$ in $W_1$ and the quantity $N_i$ of bits occupied by the quantized value of the $i^{th}$ element in $W_2$ are determined. For $p_i$ (i=2 to K) in $W_1$, quantized values of at least two elements occupy different quantities of bits, and for the elements from the second element to the $K^{th}$ element in $W_2$, quantized values of at least two elements occupy different quantities of bits. Alternatively, for $p_i$ (i=2 to K) in $W_1$, quantized values of all elements occupy a same quantity of bits, and for elements from the second element to the $K^{th}$ element in $W_2$, quantized values of at least two elements occupy different quantities of bits. Alternatively, for $p_i$ (i=2 to K) in $W_1$, quantized values of at least two elements occupy different quantities of bits, and for the elements from the second element to the $K^{th}$ element in $W_2$, quantized values of all elements occupy a same quantity of bits.

During an actual operation, there may be a plurality of methods for obtaining $W_1$ and $W_2$. For example, first, $W_1$ and $W_2$ may be determined based on the wideband channel information, and then, one of $W_1$ and $W_2$ is updated based on the narrowband channel information. In this way, one of the obtained $W_1$ and $W_2$ is obtained based on the wideband information, and the other one is obtained based on the narrowband information. For the foregoing content, refer to the prior art, and details are not described in this specification. Alternatively, $W_1$ and $W_2$ may be determined based on the narrowband channel information, and then, one of $W_1$ and $W_2$ is updated based on the wideband channel information. In this way, one of the obtained $W_1$ and $W_2$ is obtained based on the wideband information, and the other one is obtained based on the narrowband information. For the foregoing content, refer to the prior art, and details are not described in this specification. Alternatively, $W_1$ and $W_2$ may be respectively determined based on the wideband channel information and the narrowband channel information, and a specific method is not described.

Figure 2:
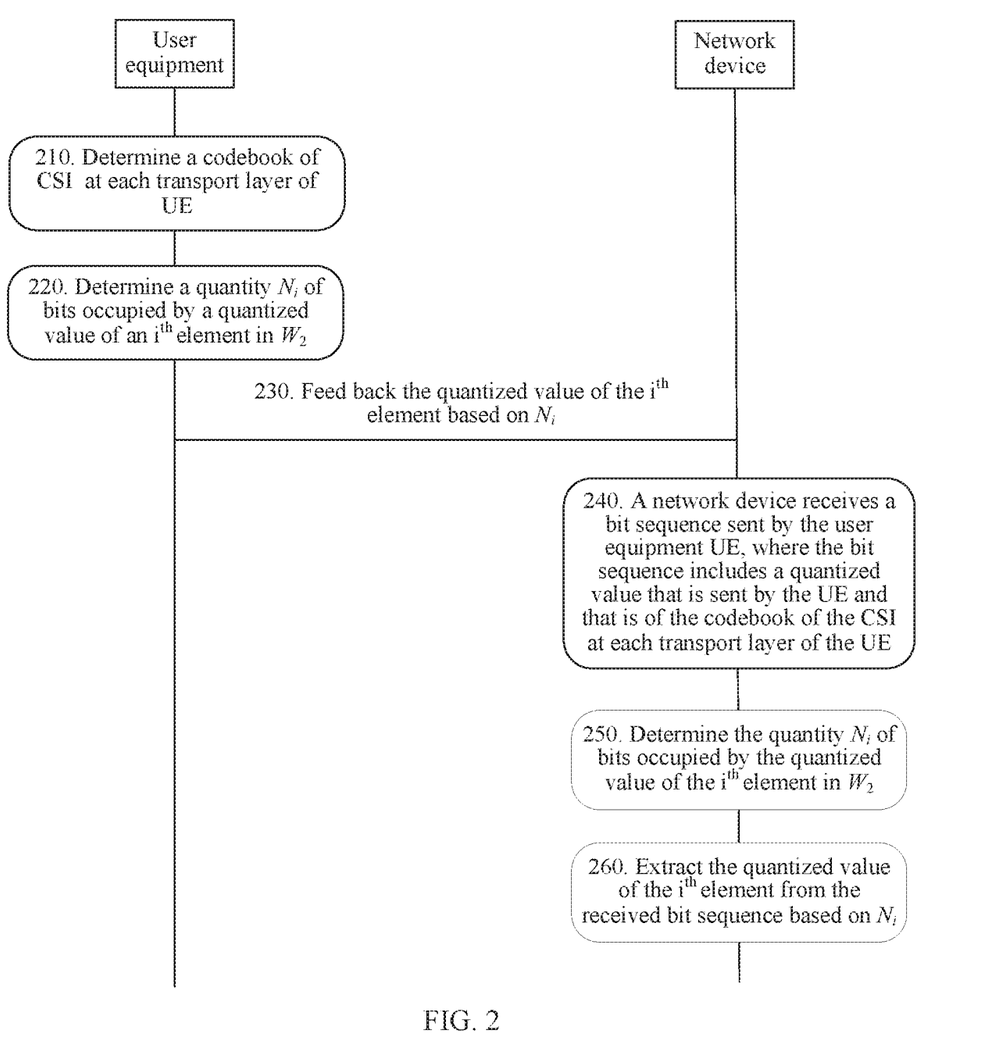
FIG. 2 is a schematic diagram of a CSI feedback process according to an embodiment of the present invention.

FIG. 2 is a schematic flowchart of a channel state information CSI feedback method 200 according to a first embodiment of the present invention. The method may be applicable to the communications system in FIG. 1.

The method 200 includes the following steps.

S210. UE determines a codebook of CSI of the user equipment UE at each transport layer.

For descriptions of the codebook of the CSI at each transport layer of the UE, refer to the foregoing descriptions, and details are not described herein again.

Optionally, before determining the codebook of the CSI at each transport layer of the UE, the UE may receive a pilot sent by a network device. The user equipment determines channel information based on the received pilot. For example, the channel information may be represented as a channel matrix. The user equipment determines, based on the determined channel information and a preset coding codebook, the codebook used to represent the CSI of the UE.

Optionally, an element $X_i$ in $W_2$ may be a complex number, $X_i$ may be represented as $X_i = \alpha_i e^{j\theta_i}$, $\alpha_i$ represents amplitude of an $i^{th}$ element, and $\theta_i$ represents a phase of the $i^{th}$ element.

S220. The UE determines a quantity $N_i$ of bits occupied by a quantized value of an $i^{th}$ element in $W_2$, where quantized values of at least two elements in $W_2$ occupy different quantities of bits.

A quantity of bits occupied by quantized values of all elements in $W_2$ may be represented by using $N_{total}$. Optionally, $N_{total} = K*M$, where K is a quantity of columns of $W_1$, K is a positive integer greater than or equal to 1, and M is a mean of quantities of bits of quantized values per element when a column vector of $W_2$ is quantized.

Optionally, a quantized value of $b_i$ in $W_1$ and a quantity of bits occupied by the quantized value of $b_i$ in $W_1$ need to be determined.

Optionally, if the element $X_i$ in $W_2$ is a complex number, a quantized value of amplitude of the element $X_i$ and a quantized value of a phase of the element $X_i$ need to be separately determined. The method further includes: separately determining a quantity $N_{i\text{-}amp}$ of bits occupied by a quantized value of the amplitude of the $i^{th}$ element and a quantity $N_{i\text{-}phase}$ of bits occupied by a quantized value of the phase of the $i^{th}$ element. Optionally, when $N_i$ is less than a threshold, $N_{i\text{-}phase} = N_i$; or when $N_i$ is greater than or equal to a threshold, $N_{i\text{-}amp}$ and $N_{i\text{-}phase}$ are determined based on a ratio, and $N_{i\text{-}amp} + N_{i\text{-}phase} = N_i$. For example, $$N_{i\text{-}phase} = \begin{cases} N_i & N_i \leq 2 \\ 2 & 2 < N_i \leq 4 \\ \lfloor N_i * \omega \rfloor & N_i > 4 \end{cases},$$

and $N_{i\text{-}amp} = N_i - N_{i\text{-}phase}$, where $0 < \omega < 1$, and $\omega$ is a ratio of $N_{i\text{-}phase}$ to $N_{total}$.

Optionally, the $i^{th}$ element in $W_2$ may be divided into a real part and an imaginary part for separate quantization. For details, refer to the foregoing amplitude and phase quantization method.

Optionally, the quantized value of $b_i$ in $W_1$ and the bit occupied by the quantized value of $b_i$ in $W_1$ need to be determined.

S230. The UE feeds back the quantized value of the $i^{th}$ element to a network device based on $N_i$.

When the UE feeds back the quantized value of the i element based on $N_i$, the UE usually adds the quantized value of the $i^{th}$ element to a corresponding precoding matrix indicator (PMI) based on $N_i$, and feeds back the precoding matrix indicator to the network device as CSI.

Optionally, the UE feeds back the quantized value of $b_i$ in $W_1$ to the network device based on the bit occupied by the quantized value of $b_i$ in $W_1$. To be specific, the quantized value of $b_i$ in $W_1$ is added to a corresponding precoding matrix indicator (PMI), and the precoding matrix indicator is fed back to the network device as CSI.

Optionally, the network device and the UE may predetermine the bit occupied by the quantized value of the $i^{th}$ element in $W_2$, or the network device may determine, based on the bit occupied by the quantized value of $b_i$ in $W_1$, the bit occupied by the quantized value of the $i^{th}$ element in $W_2$, or the UE notifies the bit occupied by the quantized value of the $i^{th}$ element in $W_2$.

S240. The network device receives a bit sequence sent by the user equipment UE, where the bit sequence includes the quantized value of the codebook of the CSI at each transport layer of the UE.

The quantized value of the codebook of the CSI at each transport layer of the UE includes a quantized value of the element $X_i$ in $W_2$, and the quantized values of at least two elements in $W_2$ occupy different quantities of bits in the bit sequence.

Optionally, if the element $X_i$ in $W_2$ is a complex number, the quantized value of the element $X_i$ in $W_2$ includes the quantized value of the amplitude of the element $X_i$ and the quantized value of the phase of the element $X_i$.

Optionally, if the UE sends the quantized value of $b_i$ in $W_1$, the network device receives the quantized value of $b_i$ in $W_1$ from the UE.

S250. The network device determines the quantity $N_i$ of bits occupied by the quantized value of the $i^{th}$ element in $W_2$.

Optionally, if the UE adds the quantized value of $b_i$ in $W_1$ to the corresponding precoding matrix indicator (PMI), and feeds back the precoding matrix indicator to the network device as CSI, the method further includes: determining, by the network device, the quantity of bits occupied by the quantized value of $b_i$ in $W_1$.

Optionally, if the element $X_i$ in $W_2$ is a complex number, the method further includes: separately determining the quantity $N_{i\text{-}amp}$ of bits occupied by the quantized value of the amplitude of the $i^{th}$ element and the quantity $N_{i\text{-}phase}$ of bits occupied by the quantized value of the phase of the $i^{th}$ element. This step is similar to step S220, and for details, refer to step S220.

S260. The network device extracts the quantized value of the $i^{th}$ element from the received bit sequence based on $N_i$.

Optionally, if the UE adds the quantized value of $b_i$ in $W_1$ to the corresponding precoding matrix indicator (PMI), and feeds back the precoding matrix indicator to the network device as CSI, the method further includes: extracting, by the network device, the quantized value of $b_i$ based on the quantity of bits occupied by the quantized value of $b_i$ in $W_1$.

Optionally, the network device and the UE may predetermine the bit occupied by the quantized value of the $i^{th}$ element in $W_2$, or the network device may determine, based on the bit occupied by the quantized value of $b_i$ in $W_1$, the bit occupied by the quantized value of the $i^{th}$ element in $W_2$, or the UE notifies the bit occupied by the quantized value of the $i^{th}$ element in $W_2$. The network device extracts the quantized value of the $i^{th}$ element from the received bit sequence based on the bit occupied by the quantized value of the $i^{th}$ element and based on $N_i$.

In this embodiment of the present invention, the quantity $N_i$ of bits occupied by the quantized value of the $i^{th}$ element is determined, and the quantized values of at least two elements in $W_2$ occupy different quantities of bits, so that quantization precision can be improved, and further, CSI feedback precision can be improved.

A second embodiment of the present invention provides another CSI feedback method. A difference between the second embodiment and the first embodiment lies in that the method further includes: performing, by the UE, normalization processing on $W_2$ based on an $N^{th}$ element in $W_2$, where N is an integer greater than or equal to 1 and less than or equal to K. Determining a quantity $N_i$ of bits occupied by a quantized value of an $i^{th}$ element in $W_2$ includes: when i=N, $N_i$=0. In other words, a sum of quantities of quantization bits of (K−1) elements other than the $N^{th}$ element is $N_{total}$. In other words, the $N^{th}$ element does not need to be quantized.

Optionally, a value of N is a value pre-agreed on between the UE and the network device. In other words, the network device and the UE learn of, in advance, a reference of quantizing the $i^{th}$ element in $W_2$, and a quantized value of the $N^{th}$ element does not need to be notified. For example, N is equal to 1 or K. In other words, the $N^{th}$ element is the first or last element in $W_2$. Optionally, if a sequence of PMIs of the codebook $W_1$ corresponding to elements in $W_2$ is predetermined, the PMIs of the codebook $W_1$ are sorted to improve performance of the present invention. For example, when the UE selects a PMI of the codebook $W_1$, calculated ideal amplitude values of elements of a column vector of the codebook $W_2$ are sorted in descending or ascending order. For example, the $N^{th}$ element is an element corresponding to a maximum value in all elements in each column in the codebook $W_2$.

In the second CSI feedback method provided in this embodiment of the present invention, the value of N is a value pre-agreed on between the UE and the network device, the UE does not need to notify the network device of the quantized value of the $N^{th}$ element, and a sum of quantities of quantization bits of (K−1) elements other than the $N^{th}$ element is $N_{total}$, so that quantization precision can be further improved.

A third embodiment of the present invention provides another CSI feedback method. A difference of the third embodiment from the second embodiment and the first embodiment lies in that the determining a quantity $N_i$ of bits occupied by a quantized value of an $i^{th}$ element in $W_2$ includes: when i≠N, a value of $N_i$ is positively correlated to an amplitude value of an $i^{th}$ element.

Optionally, when i≠N, $$N_i = N_{total} \cdot \left\lfloor \frac{\rho_i}{\sum_{i=1}^{K} \rho_i} \right\rfloor.$$

$\rho_i$ is the amplitude value of the $i^{th}$ element, $\lfloor x \rfloor$ represents a largest integer not greater than x, and $N_{total}$ is a quantity of bits occupied by quantized values of all elements in $W_2$.

Optionally, $N_i = N_{base} + N_{add,i}$. $N_{base}$ is a base quantity of bits occupied by the quantized value of the $i^{th}$ element, and $N_{add,i}$ is an additional quantity of bits occupied by the quantized value of the $i^{th}$ element.

Optionally, $N_{add,i}$ is obtained after allocation is further performed based on a quantity $N_{rest} = N_{total} - (K-1)N_{base}$ of remaining bits, and $$N_{add,i} = \begin{cases} N_{total} - (K-1)N_{base} & i = 1 \\ \lfloor N_{add,i-1}/2 \rfloor & i > 2 \\ 1 & N_{add,i-1} = 1 \end{cases}.$$

$\lfloor x \rfloor$ represents a largest integer not greater than x.

In the third embodiment, the quantity $N_i$ of bits occupied by the quantized value of the $i^{th}$ element in $W_2$ is positively correlated to the amplitude value of the $i^{th}$ element so that quantization precision can be further improved.

A fourth embodiment of the present invention provides another CSI feedback method. A difference between the fourth embodiment and the foregoing embodiments lies in that: if $X_i$ is a complex number and includes amplitude and a phase, when i≠N, the method further includes: quantizing the amplitude of the $i^{th}$ element. Quantizing the amplitude of the $i^{th}$ element includes: when quantizing the amplitude of the $i^{th}$ element, quantizing differential amplitude of the $i^{th}$ element, where the differential amplitude of the $i^{th}$ element is a ratio $$\frac{\rho_i}{\rho_{i-1}}$$

of the amplitude value $\rho_i$ of the $i^{th}$ element to an amplitude value $\rho_{i-1}$ of an $(i-1)^{th}$ element.

Optionally, quantizing $$\frac{\rho_i}{\rho_{i-1}}$$

includes: mapping the differential amplitude $$\frac{\rho_i}{\rho_{i-1}}$$

of the $i^{th}$ element to an angle domain to obtain $\zeta_i$, and quantizing $\zeta_i$.

When the amplitude value of the $i^{th}$ element is less than the amplitude value of the $(i-1)^{th}$ element, a range of the differential amplitude is (0, 1), and $$\frac{\rho_i}{\rho_{i-1}}$$

is mapped to the angle domain for quantization. When the amplitude value of the $i^{th}$ element is greater than the amplitude value of $(i-1)^{th}$ element, a quantized value of the differential amplitude of the $i^{th}$ element is set to 1. For example:

$$\begin{cases} \zeta_i = \frac{4}{\pi}\tan^{-1}\left(\frac{\rho_i}{\rho_{i-1}}\right) & \rho_{i-1} > \rho_i \\ \zeta_i = 1 & \rho_{i-1} < \rho_i \end{cases}.$$

Optionally, a quantized value of the amplitude of the $i^{th}$ element is:

$$(\rho_i)^q = (\rho_{i-1})^q \cdot \left(\frac{\rho_i}{\rho_{i-1}}\right)^q.$$

$(\rho_i)^q$ represents the quantized value of the amplitude of the $i^{th}$ element in $W_2$, and $$\left(\frac{\rho_i}{\rho_{i-1}}\right)^q$$

represents the quantized value of the differential amplitude of the $i^{th}$ element in $W_2$.

Optionally, $X_i$ is a complex number and includes amplitude and a phase, and when i≠N, the method further includes: quantizing the phase of the $i^{th}$ element by using multiple phase shift keying MPSK. Optionally, quantizing the phase of the $i^{th}$ element by using MPSK includes:

when a quantity of bits allocated for quantizing the phase of the $i^{th}$ element is b, the quantized phase belongs to $$\frac{j}{2^b}2\pi,$$

where $j=\sim 2^b-1$.

In the fourth embodiment, when the amplitude of the $i^{th}$ element in $W_2$ is quantized, the differential amplitude of the $i^{th}$ element is quantized, and the differential amplitude of the $i^{th}$ element is the ratio $$\frac{\rho_i}{\rho_{i-1}}$$

of the amplitude value $\rho_i$ of the $i^{th}$ element to the amplitude value $\rho_{i-1}$ of the $(i-1)^{th}$ element. Differential amplitude of an element is quantized so that a quantization range is reduced, and further, quantization precision is improved.

Figure 3:
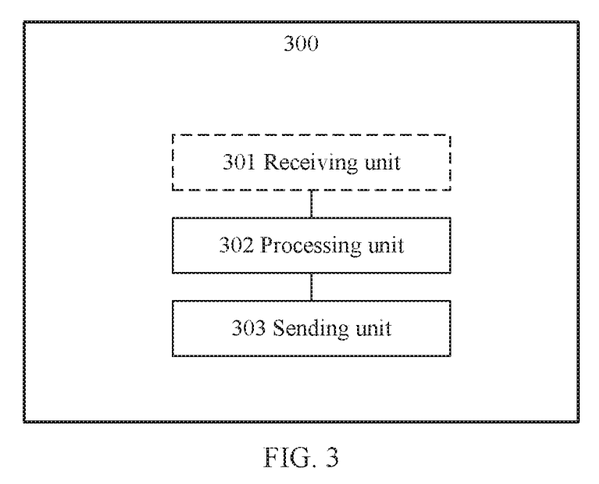
FIG. 3 is a schematic structural diagram of user equipment according to an embodiment of the present invention.

Based on a same technical idea, an embodiment of the present invention provides user equipment 300, configured to perform the method in the embodiments of the present invention. For related content, refer to the descriptions of the method, and details are not described herein again. The user equipment can communicate with a network device provided in the embodiments of the present invention. As shown in FIG. 3:

The user equipment 300 includes a processing unit 302 and a sending unit 303. The processing unit 302 may be specifically a processor, and the sending unit 303 may be specifically a transmitter. Optionally, the user equipment 300 may further include a receiving unit 301. The receiving unit 301 may be specifically a receiver.

The processing unit 302 is configured to determine a codebook of CSI of the UE at each transport layer. For related information of the codebook of the UE of the CSI at each transport layer, refer to the foregoing descriptions, and details are not described herein again.

The processing unit 302 is further configured to determine a quantity $N_i$ of bits occupied by a quantized value of an $i^{th}$ element in $W_2$, where quantized values of at least two elements in $W_2$ occupy different quantities of bits.

The sending unit 303 is configured to feed back the quantized value of the $i^{th}$ element to the network device based on $N_i$.

Optionally, the receiving unit 301 is configured to receive pilot information sent by the network device, and the processing unit 302 is configured to: determine channel information based on the pilot information received by the receiving unit 301, and determine the codebook of the UE based on the channel information. The processing unit 302 is further configured to quantize the codebook of the UE to obtain a quantized value.

Optionally, the processing unit 302 is further configured to perform normalization processing on $W_2$ based on an $N^{th}$ element in $W_2$, where N is an integer greater than or equal to 1 and less than or equal to K; and when $i=N$, $N_i=0$.

Optionally, when $i \neq N$, a value of $N_i$ is positively correlated to an amplitude value of the $i^{th}$ element.

Optionally, a value of N is a value pre-agreed on between the UE and the network device. For example, N is equal to 1 or K.

Optionally, when $i \neq N$, $$N_i = N_{total} \cdot \left\lfloor \frac{\rho_i}{\sum_{i=1}^{K}\rho_i} \right\rfloor,$$

where $\rho_i$ is the amplitude value of the $i^{th}$ element, $\lfloor x \rfloor$ represents a largest integer not greater than x, and $N_{total}$ is a quantity of bits occupied by quantized values of all elements in $W_2$.

Optionally, when $i \neq N$, $N_i = N_{base} + N_{add,i}$, where $N_{base}$ is a base quantity of bits occupied by the quantized value of the $i^{th}$ element, and $N_{add,i}$ is an additional quantity of bits occupied by the quantized value of the $i^{th}$ element.

Optionally, $N_{add,i}$ is obtained after allocation is further performed based on a quantity $N_{rest}=N_{total}-(K-1)N_{base}$ of remaining bits, and $$N_{add,i} = \begin{cases} N_{total} - (K-1)N_{base} & i=1 \\ \lfloor N_{add,i-1}/2 \rfloor & i>2 \\ 1 & N_{add,i-1}=1 \end{cases}.$$

$\lfloor x \rfloor$ represents a largest integer not greater than x.

Optionally, $X_i$ is a complex number and includes amplitude and a phase, and when $i \neq N$, the processing unit 302 is further configured to quantize amplitude of the $i^{th}$ element; and when quantizing the amplitude of the $i^{th}$ element, the processing unit 302 is configured to quantize differential amplitude of the $i^{th}$ element, where the differential amplitude of the $i^{th}$ element is a ratio $$\frac{\rho_i}{\rho_{i-1}}$$

of the amplitude value $\rho_i$ of the $i^{th}$ element to an amplitude value of $\rho_{i-1}$ an $(i-1)^{th}$ element.

Optionally, the processing unit 302 is configured to: map the differential amplitude $$\frac{\rho_i}{\rho_{i-1}}$$

of the $i^{th}$ element to an angle domain to obtain, $\zeta_i$; and quantize $\zeta_i$.

Optionally, when the amplitude value of the $i^{th}$ element is less than the amplitude value of the $(i-1)^{th}$ element, a range of the differential amplitude is (0, 1), and the processing unit 302 is configured to map the differential amplitude $$\frac{\rho_i}{\rho_{i-1}}$$

of the $i^{th}$ element to the angle domain for quantization; or when the amplitude value of the $i^{th}$ element is greater than the amplitude value of the $(i-1)^{th}$ element, the processing unit 302 is configured to set a quantized value of the amplitude of the $i^{th}$ element to 1. For example, $$\begin{cases} \zeta_i = \frac{4}{\pi}\tan^{-1}\left(\frac{\rho_i}{\rho_{i-1}}\right) & \rho_{i-1} > \rho_i \\ \zeta_i = 1 & \rho_{i-1} < \rho_i \end{cases}.$$

Optionally, $X_i$ is a complex number and includes amplitude and a phase, and when i≠N, the processing unit 302 is configured to quantize a phase of the $i^{th}$ element by using multiple phase shift keying MPSK.

Optionally, when a quantity of bits allocated for quantizing the phase of the $i^{th}$ element is b, the quantized phase belongs to $$\frac{j}{2^b}2\pi,$$

where $j=0 \sim 2^b-1$.

Optionally, when i≠N, the processing unit 302 is configured to separately determine a quantity $N_{i\text{-}amp}$ of bits occupied by the quantized value of the amplitude of the $i^{th}$ element and a quantity $N_{i\text{-}phase}$ of bits occupied by a quantized value of the phase of the $i^{th}$ element. When $N_i$ is less than a threshold, $N_{i\text{-}phase}=N_i$; or when $N_i$ is greater than or equal to a threshold, $N_{i\text{-}amp}$ and $N_{i\text{-}phase}$ are determined based on a ratio, and $N_{i\text{-}amp}+N_{i\text{-}phase}=N_i$.

Optionally, $$N_{i\text{-}phase} = \begin{cases} N_i & N_i \le 2 \\ 2 & 2 < N_i \le 4 \\ \lfloor N_i * \omega \rfloor & N_i > 4 \end{cases},$$

and $N_{i\text{-}amp}=N_i-N_{i\text{-}phase}$, where $0<\omega<1$, and $\omega$ is a ratio of $N_{i\text{-}phase}$ to $N_{total}$.

The user equipment provided in this embodiment of the present invention determines the quantity $N_i$ of bits occupied by the quantized value of the $i^{th}$ element in $W_2$, and the quantized values of at least two elements in $W_2$ occupy different quantities of bits so that quantization precision can be improved, and further, CSI feedback precision can be improved.

Figure 4:
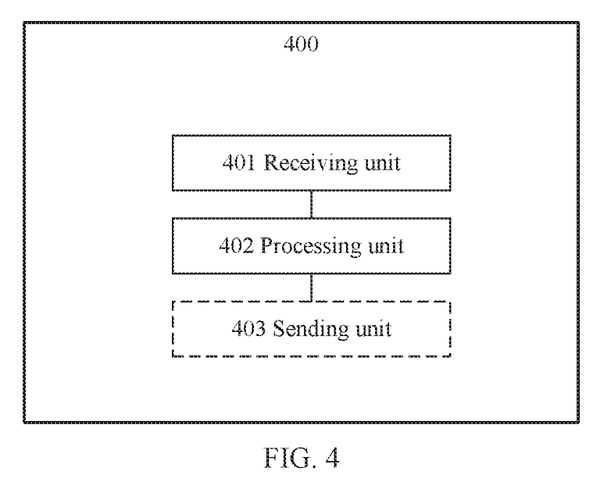
FIG. 4 is a schematic structural diagram of a network device according to an embodiment of the present invention.

Based on a same technical idea, an embodiment of the present invention provides a network device 400, configured to perform the method in the embodiments of the present invention. For related content, refer to the descriptions of the method, and details are not described herein again. The network device 400 can communicate with the user equipment provided in the embodiments of the present invention. As shown in FIG. 4:

The network device 400 includes a receiving unit 401 and a processing unit 402. The processing unit 402 may be specifically a processor, and the receiving unit 401 may be specifically a receiver. Optionally, the network device 400 may further include a sending unit 403. The sending unit 403 may be specifically a transmitter.

The receiving unit 401 is configured to receive a bit sequence sent by the user equipment UE, where the bit sequence includes a quantized value of a codebook of CSI of the UE at each transport layer, the quantized value of the codebook of the CSI at each transport layer of the UE includes a quantized value of an element $X_i$ in $W_2$, and quantized values of at least two elements in $W_2$ in the bit sequence occupy different quantities of bits. For the codebook of the CSI at each transport layer of the UE, refer to the foregoing descriptions, and details are not described herein again.

The processing unit 402 is configured to determine a quantity $N_i$ of bits occupied by a quantized value of an $i^{th}$ element in $W_2$; and configured to extract the quantized value of the $i^{th}$ element from the received bit sequence based on $N_i$.

Optionally, the processing unit 402 is further configured to: determine, based on the determined quantized value, the codebook used by the UE; and code, based on the codebook, a signal sent to the UE. The sending unit 403 is configured to send the coded signal to the UE. Optionally, the sending unit 403 is configured to send a pilot to the UE, so that the UE performs channel estimation.

Optionally, an $N^{th}$ element in $W_2$ is a reference used by the UE to perform normalization processing on $W_2$, and N is an integer greater than or equal to 1 and less than or equal to K; and when i=N, $N_i=0$.

Optionally, when i≠N, a value of $N_i$ is positively correlated to an amplitude value of the $i^{th}$ element.

Optionally, a value of N is a value pre-agreed on between the UE and the network device 400. For example, N is equal to 1 or K.

Optionally, when i≠N, $$N_i = N_{total} \cdot \left\lfloor \frac{\rho_i}{\sum_{i=1}^{K}\rho_i} \right\rfloor,$$

where $\rho_i$ is the amplitude value of the $i^{th}$ element, $\lfloor x \rfloor$ represents a largest integer not greater than x, and $N_{total}$ is a quantity of bits occupied by quantized values of all elements in $W_2$.

Optionally, when i≠N, $N_i=N_{base}+N_{add,i}$, where $N_{base}$ is a base quantity of bits occupied by the quantized value of the $i^{th}$ element, and $N_{add,i}$ is an additional quantity of bits occupied by the quantized value of the $i^{th}$ element.

Optionally, $N_{add,i}$ is obtained after allocation is further performed based on a quantity $N_{rest}=N_{total}-(K-1)N_{base}$, of remaining bits, and $$N_{add,i} = \begin{cases} N_{total} - (K-1)N_{base} & i = 1 \\ \lfloor N_{add,i-1}/2 \rfloor & i > 2 \\ 1 & N_{add,i-1} = 1 \end{cases}.$$

$\lfloor x \rfloor$ represents a largest integer not greater than x.

Optionally, $X_i$ is a complex number and includes amplitude and a phase, and when i≠N, the processing unit 402 is configured to separately determine a quantity $N_{i\text{-}amp}$ of bits occupied by a quantized value of amplitude of the $i^{th}$ element and a quantity $N_{i\text{-}phase}$ of bits occupied by a quantized value of a phase of the $i^{th}$ element. The quantized value of the amplitude of the $i^{th}$ element is differential amplitude of the $i^{th}$ element, and the differential amplitude of the $i^{th}$ element is a ratio $$\frac{\rho_i}{\rho_{i-1}}$$

of the amplitude value $\rho_i$ of the $i^{th}$ element to an amplitude value $\rho_{i-1}$ of an $(i-1)^{th}$ element.

Optionally, when $N_i$ is less than a threshold, $N_{i\text{-}phase}=N_i$, or when $N_i$ is greater than or equal to a threshold, $N_{i\text{-}amp}$ and $N_{i\text{-}phase}$ are determined based on a ratio, and $N_{i\text{-}amp}+N_{i\text{-}phase}=N_i$, Optionally, $$N_{i\text{-}phase} = \begin{cases} N_i & N_i \le 2 \\ 2 & 2 < N_i \le 4, \\ \lfloor N_i * \omega \rfloor & N_i > 4 \end{cases}$$

and $N_{i\text{-}amp}=N_i-N_{i\text{-}phase}$, where $0<\omega<1$, and $\omega$ is a ratio of $N_{i\text{-}phase}$ to $N_{total}$.

Optionally, the quantized value of the amplitude of the $i^{th}$ element is:

$$(\rho_i)^q = (\rho_{i-1})^q \cdot \left(\frac{\rho_i}{\rho_{i-1}}\right)^q.$$

$(\rho_i)^q$ represents the quantized value of the amplitude of the $i^{th}$ element in $W_2$, and $$\left(\frac{\rho_i}{\rho_{i-1}}\right)^q$$

represents a quantized value of the differential amplitude of the $i^{th}$ element in $W_2$.

The network device 400 provided in this embodiment of the present invention determines the quantity $N_i$ of bits occupied by the quantized value of the $i^{th}$ element in $W_2$, and the quantized values of at least two elements in $W_2$ occupy different quantities of bits, so that quantization precision can be improved, and further, CSI feedback precision can be improved.

An embodiment of the present invention provides a communications system, including the user equipment and the network device that are provided in the embodiments of the present invention.

Figure 5:
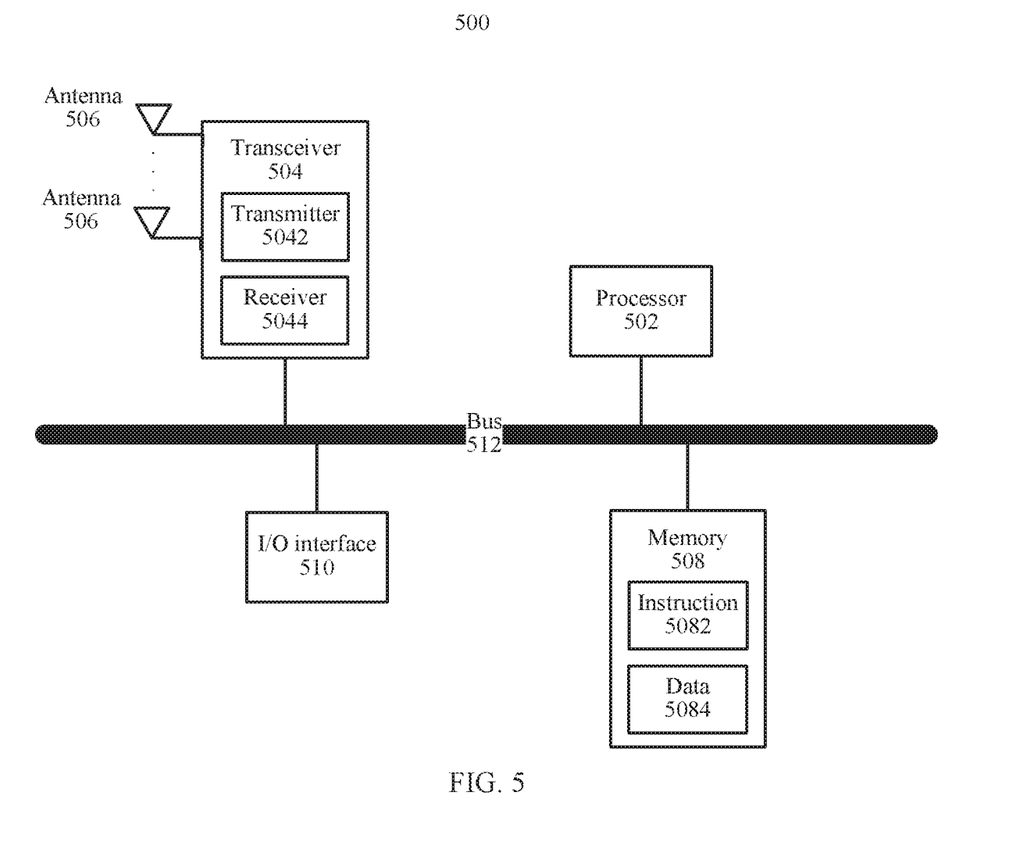
FIG. 5 is a schematic structural diagram of user equipment according to an embodiment of the present invention.

Based on a same technical idea, an embodiment of the present invention provides user equipment 500, configured to perform the method in the embodiments of the present invention. For related content, refer to the descriptions of the method, and details are not described herein again. FIG. 5 is a schematic diagram of a hardware structure of the user equipment 500 according to an embodiment of the present invention. As shown in FIG. 5, the user equipment 500 includes a processor 502, a transceiver 504, a plurality of antennas 506, a memory 508, an I/O (input/output) interface 510, and a bus 512. The transceiver 504 further includes a transmitter 5042 and a receiver 5044. The memory 508 is further configured to store an instruction 5082 and data 5084. In addition, the processor 502, the transceiver 504, the memory 508, and the/O interface 510 communicate with and are connected to each other by using the bus 512, and the plurality of antennas 506 are connected to the transceiver 504.

The processor 502 may be a general purpose processor, and for example, includes but is not limited to a central processing unit (CPU), or may be a dedicated processor, and for example, includes but is not limited to a digital signal processor (DSP), an application-specific integrated circuit (ASIC), and a field programmable gate array (FPGA). In addition, the processor 502 may be alternatively a combination of a plurality of processors. The processor 502 is configured to perform the CSI feedback method provided in the embodiments of the present invention. The processor 502 may be a processor dedicated to performing the foregoing operations and/or steps, or the processor may read and execute the instruction 5082 stored in the memory 508 to perform the foregoing operations and/or steps. The processor 502 may need to use the data 5084 during a process of performing the foregoing operations and/or steps.

The transceiver 504 includes the transmitter 5042 and the receiver 5044. The transmitter 5042 is configured to send an uplink signal to the network device by using at least one of the plurality of antennas 506. The receiver 5044 is configured to receive a downlink signal from the network device by using at least one of the plurality of antennas 506. The transmitter 5042 is specifically configured to perform an action by using at least one of the plurality of antennas 506, and the receiver 5044 is specifically configured to perform an action by using at least one of the plurality of antennas 506.

The memory 508 may be various types of storage media, for example, a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, an optical memory, and a register. The memory 508 is specifically configured to store the instruction 5082 and the data 5084. The processor 502 may read and execute the instruction 5082 stored in the memory 508 to perform the foregoing operations and/or steps, and may need to use the data 5084 during a process of performing the foregoing operations and/or steps.

The I/O interface 510 is configured to: receive an instruction and/or data from a peripheral device, and send an instruction and/or data to the peripheral device.

It should be noted that during a specific implementation process, the user equipment 500 may further include another hardware component, and no enumeration is provided herein.

Figure 6:
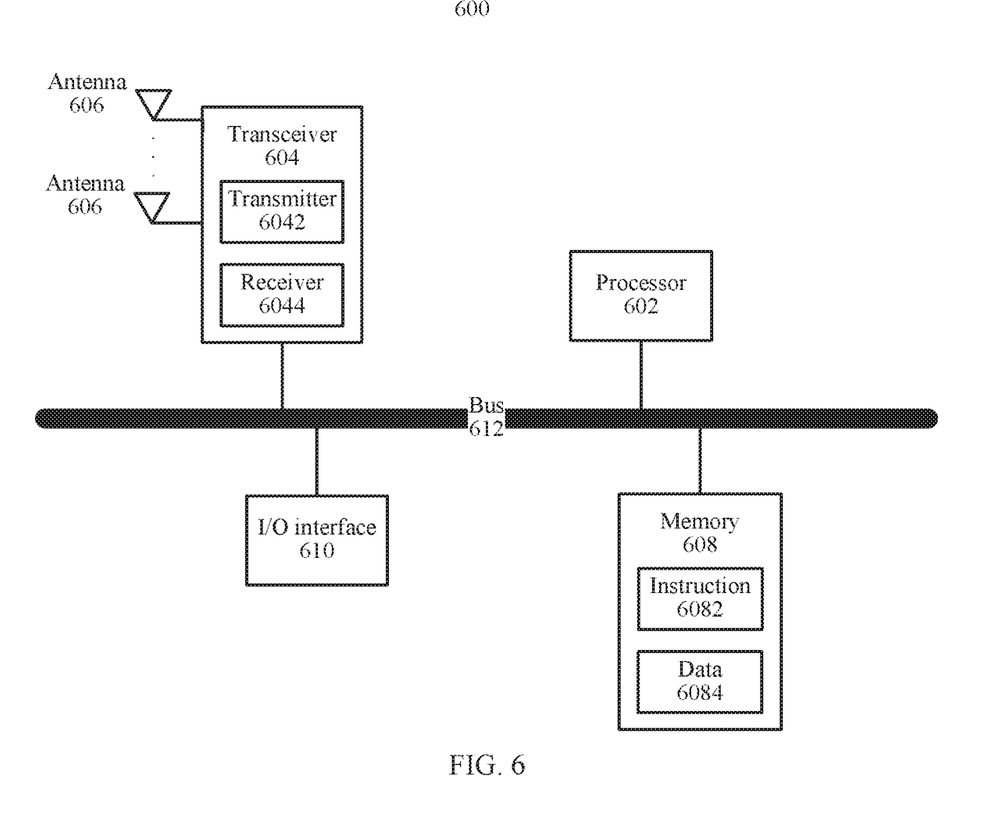
FIG. 6 is a schematic structural diagram of a network device according to an embodiment of the present invention.

Based on a same technical idea, an embodiment of the present invention provides a network device 600, configured to perform the method in the embodiments of the present invention. For related content, refer to the descriptions of the method, and details are not described herein again. FIG. 6 is a schematic diagram of a hardware structure of the network device 600 according to an embodiment of the present invention. As shown in FIG. 6, the network device 600 includes a processor 602, a transceiver 604, a plurality of antennas 606, a memory 608, an I/O (input/output) interface 610, and a bus 612. The transceiver 604 further includes a transmitter 6042 and a receiver 6044. The memory 608 is further configured to store an instruction 6082 and data 6084. In addition, the processor 602, the transceiver 604, the memory 608, and the I/O interface 610 communicate with and are connected to each other by using the bus 612, and the plurality of antennas 606 are connected to the transceiver 604.

The processor 602 may be a general purpose processor, and for example, includes but is not limited to a CPU, or may be a dedicated processor, and for example, includes but is not limited to a DSP, an ASIC, and an FPGA. In addition, the processor 602 may be alternatively a combination of a plurality of processors. The processor 602 is configured to perform the method in the embodiments of the present invention. The processor 602 may be a processor dedicated to performing the foregoing operations and/or steps, or the processor may read and execute the instruction 6082 stored in the memory 608 to perform the foregoing operations and/or steps. The processor 602 may need to use the data 6084 during a process of performing the foregoing operations and/or steps.

The transceiver 604 includes the transmitter 6042 and the receiver 6044. The transmitter 6042 is configured to send a downlink signal to the user equipment by using at least one of the plurality of antennas 606. The receiver 6044 is configured to receive an uplink signal from the user equipment by using at least one of the plurality of antennas 606. The transmitter 6042 is specifically configured to perform an action by using at least one of the plurality of antennas 606, and the receiver 6044 is specifically configured to perform an action by using at least one of the plurality of antennas 606.

The memory 608 may be various types of storage media, for example, a RAM, a ROM, an NVRAM, a PROM, an EPROM, an EEPROM, a flash memory, an optical memory, and a register. The memory 608 is specifically configured to store the instruction 6082 and the data 6084. The processor 602 may read and execute the instruction 6082 stored in the memory 608 to perform the foregoing operations and/or steps. The processor may need to use the data 6084 during a process of performing the foregoing operations and/or steps.

The I/O interface 610 is configured to: receive an instruction and/or data from a peripheral device, and send an instruction and/or data to the peripheral device.

It should be noted that during a specific implementation process, the network device 600 may further include another hardware component, and no enumeration is provided herein.

A person of ordinary skill in the art may understand that all or some of the steps of the foregoing methods may be implemented by a program instructing relevant hardware. The program may be stored in a computer readable storage medium. The storage medium includes: a ROM, a RAM, and an optical disc.

To sum up, the foregoing descriptions are merely examples of embodiments of the present invention, but are not intended to limit the protection scope of the present invention. Any modification, equivalent replacement, or improvement made without departing from the spirit and principle of the present invention shall fall within the protection scope of the present invention.

What is claimed is:

1. A network device, comprising:
   at least one processor; and
   a memory coupled to the at least one processor, the memory configured to store at least one computer instruction which, when executed by the at least one processor, causes the at least one processor to perform:
   transmitting a pilot; and
   receiving feedback of $W_1$ and $W_2$ for each transport layer which are determined based on the pilot, wherein $W_1$ and $W_2$ are used to form a combined vector W for each transport layer, $W=W_1 \times W_2$, $W_1=[b_1\ b_2\ \ldots\ b_K]$, $b_i$ is a vector to be combined, $W_2=[X_1\ X_2\ \ldots\ X_K]^T$, $X_i$ is a weighting coefficient corresponding to $b_i$, K is a quantity of vectors in $W_1$, K is a positive integer which is greater than 1, i is an integer, $1 \leq i \leq K$, and quantities of bits for feeding back at least two elements in $W_2$ are different from each other.

2. The network device according to claim 1, wherein an $N^{th}$ element in $W_2$ is a normalization reference element, a quantity of bits of the $N^{th}$ element is zero, and quantities of bits for at least two elements except the $N^{th}$ element in $W_2$ are different from each other.

3. The network device according to claim 2, wherein $X_i$ is a complex number, and when $i \neq N$, a quantity of bits of $X_i$ is positively correlated to an amplitude of $X_i$.

4. The network device according to claim 2, wherein a value of N is a value pre-agreed on between a user equipment (UE) and the network device.

5. The network device according to claim 1, wherein $X_i$ is a complex number, and a quantity of bits of $X_i$ is a sum of a quantity of bits of an amplitude of $X_i$ and a quantity of bits of a phase of $X_i$.

6. The network device according to claim 1, wherein $b_i$ is selected from a vector set.

7. A channel state information (CSI) receiving method, comprising:
   transmitting a pilot; and
   receiving feedback of $W_1$ and $W_2$ for each transport layer which are determined based on the pilot, wherein $W_1$ and $W_2$ are used to form a combined vector W for each transport layer, $W=W_1 \times W_2$, $W_1=[b_1\ b_2\ \ldots\ b_K]$, $b_i$ is a vector to be combined, $W_2=[X_1\ X_2\ \ldots\ X_K]^T$, $X_i$ is a weighting coefficient corresponding to $b_i$, K is a quantity of vectors in $W_1$, K is a positive integer which is greater than 1, i is an integer, $1 \leq i \leq K$, and quantities of bits for feeding back at least two elements in $W_2$ are different from each other.

8. The method according to claim 7, wherein an $N^{th}$ element in $W_2$ is a normalization reference element, a quantity of bits of the $N^{th}$ element is zero, and quantities of bits for at least two elements except the $N^{th}$ element in $W_2$ are different from each other.

9. The method according to claim 8, wherein $X_i$ is a complex number, and when $i \neq N$, a quantity of bits of $X_i$ is positively correlated to an amplitude of $X_i$.

10. The method according to claim 8, wherein a value of N is a value pre-agreed on between a user equipment (UE) and a network device.

11. The method according to claim 7, wherein $X_i$ is a complex number, and a quantity of bits of $X_i$ is a sum of a quantity of bits of an amplitude of $X_i$ and a quantity of bits of a phase of $X_i$.

12. The method according to claim 7, wherein $b_i$ is selected from a vector set.

13. A non-transitory computer readable storage medium, configured to store a computer program instruction which, when executed by at least one processor, cause the at least one processor to perform:
    transmitting a pilot; and
    receiving feedback of $W_1$ and $W_2$ for each transport layer which are determined based on the pilot, wherein $W_1$ and $W_2$ are used to form a combined vector W for each transport layer, $W=W_1 \times W_2$, $W_1=[b_1\ b_2\ \ldots\ b_K]$, $b_i$ is a vector to be combined, $W_2=[X_1\ X_2\ \ldots\ X_K]^T$, $X_i$ is a weighting coefficient corresponding to $b_i$, K is a quantity of vectors in $W_1$, K is a positive integer which is greater than 1, i is an integer, $1 \leq i \leq K$, and quantities of bits for feeding back at least two elements in $W_2$ are different from each other.

14. The medium according to claim 13, wherein an $N^{th}$ element in $W_2$ is a normalization reference element, a quantity of bits of the $N^{th}$ element is zero, and quantities of bits for at least two elements except the $N^{th}$ element in $W_2$ are different from each other.

15. The medium according to claim 14, wherein $X_i$ is a complex number, and when $i \neq N$, a quantity of bits of $X_i$ is positively correlated to an amplitude of $X_i$.

16. The medium according to claim 14, wherein a value of N is a value pre-agreed on between a user equipment (UE) and a network device.

17. The medium according to claim 13, wherein $X_i$ is a complex number, and a quantity of bits of $X_i$ is a sum of a quantity of bits of an amplitude of $X_i$ and quantity of bits of a phase of $X_i$.

18. The medium according to claim 13, wherein $b_i$ is selected from a vector set.

19. A network device, comprising:
- a transmitter, the transmitter configured to transmit a pilot; and
- a receiver, the receiver configured to receive feedback of $W_1$ and $W_2$ for each transport layer which are determined based on the pilot, wherein $W_1$ and $W_2$ are used to form a combined vector W for each transport layer, $W=W_1 \times W_2$, $W_1=[b_1\ b_2\ \ldots\ b_K]$, $b_i$ is a vector to be combined, $W_2=[X_1\ X_2\ \ldots\ X_K]^T$, $X_i$ is a weighting coefficient corresponding to $b_i$, K is a quantity of vectors in $W_1$, K is a positive integer which is greater than 1, i is an integer, $1 \leq i \leq K$, and quantities of bits for feeding back at least two elements in $W_2$ are different from each other.

20. The network device according to claim 19, wherein an $N^{th}$ element in $W_2$ is a normalization reference element, a quantity of bits of the $N^{th}$ element is zero, and quantities of bits for at least two elements except the $N^{th}$ element in $W_2$ are different from each other.

21. The network device according to claim 20, wherein $X_i$ is a complex number, and when $i \neq N$, a quantity of bits of $X_i$ is positively correlated to an amplitude of $X_i$.

22. The network device according to claim 20, wherein a value of N is a value pre-agreed on between a user equipment (UE) and the network device.

23. The network device according to claim 19, wherein $X_i$ is a complex number, and a quantity of bits of $X_i$ is a sum of a quantity of bits of an amplitude of $X_i$ and a quantity of bits of a phase of $X_i$.

24. The network device according to claim 19, wherein $b_i$ is selected from a vector set.

* * * * *